Patented Mar. 13, 1951

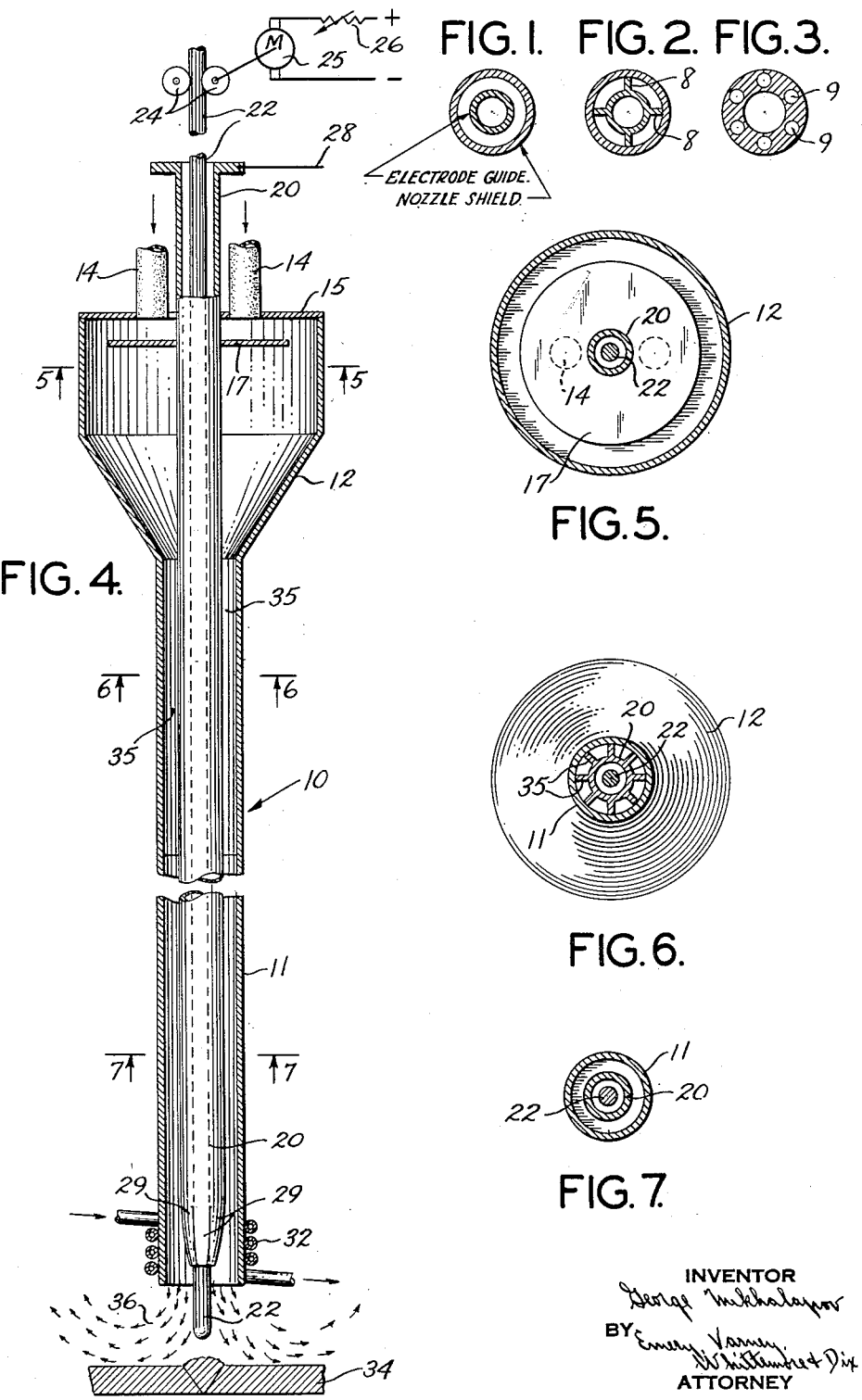

2,544,711

UNITED STATES PATENT OFFICE 2,544,711

METHOD AND APPARATUS FOR WELDING WITH GAS SHIELDS HAVING LAMINAR FLOW

George Mikhalapov, Far Hills, N. J., assignor to Air Reduction Company, Incorporated, New York, N. Y., a corporation of New York Application March 26, 1949, Serial No. 83,638

19 Claims. (Cl. 219—10)

This invention relates to arc welding with electrodes that deposit metal on the work, and relates more especially to the shielding of the metal from the atmosphere.

It is well known that electric welds must be protected from the atmosphere until the metal has cooled substantially below the temperature at which it was deposited, and that unless protected, by suitable gas shields or slag, the weld will be porous and of low ductility. Electric welding with non-consuming electrodes, that is, electrodes that do not deposit metal on the work, has been carried out with a protecting atmosphere, such a helium, around the weld; but with depositing electrodes it has been usual to rely upon a slag covering, either on the electrode or the work, to protect the metal from the atmosphere.

The shielding technique employed for electric welding with non-consuming electrodes does not give satisfactory results if used with uncoated depositing electrodes because the shielding is not sufficiently effective. Atmospheric air gets into the gas shield in sufficient quantity to produce some porosity, and to impair the ductility of the final weld. Another reason that makes the conventional gas shielding unsuitable with depositing electrodes is that higher metal temperatures are involved with depositing electrodes, some of the metal transferred through the arc being actually volatilized, and these higher temperatures make the need for protection more critical.

The transfer of metal from the electrode across the space between the electrode and the work brings the metal into more intimate contact with the gas around it than is the case with electric welding processes where non-consuming electrodes merely provide the heat for melting the metal of the workpiece. This intimate contact applies especially to such metal as is volatilized in its passage through the arc.

In welding with non-consuming electrodes under a protective atmosphere of gas, no attempt is made to insure laminar flow of the protective gas stream as it emerges from the conveying nozzle and surrounds the arc. It so happens, as will be shown later, that laminar flow of gas in quantities necessary for effective shielding, through equipment of practical dimensions, is not readily accomplished. Consequently the stream of protective gas is turbulent, that is, it does not move in a series of parallel streams or laminae, but in a swirling, random motion with each gas particle moving transversely as well as parallel to the main line of flow.

Such transverse motion aspirates a certain amount of air into the gas stream and carries it into the arc. The amount of this pollution of the protective gas stream is not great, but it is sufficient to prevent the formation of high quality ductile welds, when welding with consuming electrodes. This is well demonstrated by the fact that when the protective gas is made to move from the nozzle in a laminar and non-turbulent manner, and in a quantity sufficient to completely envelop the arc, welds of the highest quality are readily obtained.

It is an object of this invention to provide an improved method for protecting the metal during arc welding with a depositing electrode. Another object is to protect the metal without resorting to the use of coating on the electrode and in a manner that prevents the entrance of air into the critical region where the metal is at a sufficiently high temperature to be adversely affected by contact with even minute quantities of air mixed with the gas shield surrounding the arc and blanketing the work in the region of the weld. The invention provides for protecting atmospheres with laminar flow.

One of the principal advantages of the invention is that it makes practical the use of apparatus in which a long length of electrode, such as a reel of wire, can be used to weld continuously in automatic welding apparatus or in portable equipment, such as welding guns. It is a feature of the invention that the region of the arc is shielded from the surrounding air by a gas shield that moves along the electrodes with viscous or laminar flow at a sufficiently low velocity to cause the curtain of gas to spread transversely over the workpiece without turbulence.

It is another object of the invention to provide improved apparatus for welding with non-coated, depositing electrodes, and for producing such viscous or laminar flow of the gas curtain that surrounds the region of the arc for protecting the metal while at elevated temperatures.

Other objects, features and advantages of the invention will appear or be pointed out as the description proceeds.

In the drawing, forming a part hereof, in which like reference characters indicate corresponding parts in all the views, Figures 1-3 are illustrative cross sections of tubes through which gas flows.

Figure 4 is a vertical sectional view, partly diagrammatic, showing apparatus for making arc welds in accordance with this invention.

Figures 5, 6 and 7 are sectional views taken on the lines 5—5, 6—6 and 7—7, respectively, of Figure 4.

In studying the flow of gases, it will be found that the state of flow is a function of a number of variables which for convenience are usually combined into an arbitrary dimensionless number called the Reynolds number. In general, the flow of gas is laminar for low Reynolds numbers, it becomes indeterminate through a range of intermediate numbers, and is always turbulent at high Reynolds numbers. The flow of gas through circular pipes has been experimentally determined over a wide range of conditions, and it has been found that the flow is always laminar for Reynolds numbers of 1050 and lower; laminar under certain conditions only between 1050 and 3000; and always turbulent at numbers higher than 3000. The Reynolds number for circular pipes or tubes is expressed in terms of the following factors.

$$Re = \frac{dKV}{12C}$$

where
$d$ = internal diameter in inches.
$K$ = density in lbs. per cu. ft.
$C$ = absolute viscosity in lbs. per second per ft.
$V$ = average velocity of gas in feet per second.

For argon at approximately room temperature $$K/C = 7.46 \times 10^3$$

For helium at approximately room temperature $$\frac{K}{C} = 0.84 \times 10^3$$

For carbon monoxide at approximately room temperature $$\frac{K}{C} = 6.65 \times 10^3$$

For carbon dioxide at approximately room temperature $$\frac{K}{C} = 12.4 \times 10^3$$

For a gas flow of ½ and 1 cubic foot a minute through a ⅜ inch inside diameter hose the Reynolds numbers are:

|  | Air | $CO_2$ | CO | A | He |
|---|---|---|---|---|---|
| Re. at ½ cu. ft. per minute | 2,230 | 4,200 | 2,250 | 2,520 | 284 |
| Re. at 1 cu. ft. per minute | 4,460 | 8,400 | 4,500 | 5,040 | 568 |

Thus it will be seen that all gases except helium will arrive at the welding apparatus in a state of great turbulence which must be streamlined into laminar flow at the nozzle exit. However, even in the case of helium, lack of turbulence in the delivery hose will not insure laminar flow at the exit of the nozzle because considerable turbulence exists at every abrupt change in cross section or direction of flow of the gas stream.

Gas flows through conduits other than circular pipes are quite involved and no easy method exist for determining conditions requisite for streamline flow. In general, it may be assumed that laminar flow persists at very low gas velocity, but as the velocity increases there is turbulence at changes in the cross section of the gas stream and consequently the problem of restoring laminar flow in a reasonably short length of flow increases.

Unfortunately, the quantities of gas required are dictated by the needs of the arc and are substantially fixed. In general, they vary between one-half and one-and-a-half cubic feet per minute depending upon the size of the weld, magnitude of current, etc. To produce very low velocity, large passages are desirable. On the other hand, from practical consideration of ease in handling and ability to reach inside corners, equipment and particularly nozzles of minimum dimensions are desired.

The simplest practical nozzle design consists of an annular passage with the walls of the nozzle forming the outer diameter of the annulus and the electrode with its supporting tube forming the inside diameter as shown in Figure 1. In a more practical variation, as shown in Figure 2, the electrode tube is supported by means of several radial fins or partitions 8 dividing the annular space into a number of parallel passages or conduits.

Still another practical construction for introducing shielding gas to the arc is shown in Figure 3 where a series of circular passages 9 extend through the nozzle at locations surrounding the electrode.

In evaluated relative merits in the different gas carrying cross sections, it must be remembered that for laminar flow the lowest possible Reynolds number is desirable. The Reynolds number varies directly as the average velocity of the gas stream and is also a function of the dimensions and of the shape of the gas conveying conduit. For a desired delivery of gas, the velocity is an inverse function of the area of the passage as follows:

$$V = \frac{Q}{A} = \frac{144q}{60a}$$

where
$V$ = velocity in feet per second.
$q$ = gas delivery in cu. ft. per minute.
$Q$ = gas delivery in cu. ft. per second.
$A$ = total area of all gas conveying conduits in square ft.
$a$ = total area of all gas conveying conduits in square inches.

The Reynolds numbers for other than circular conduits can be computed by substituting for the diameter $d$, a factor $4M$.

$$M = \frac{a^1}{12Z}$$

$a^1$ is the cross sectional area of the conduit in square inches. $Z$ = perimeter of the conduit in inches.

The above relationship holds for most cases of turbulent flow; for values of $Re$ above 3000 in all cases, and for values of $Re$ above 2100 in most cases. Table I shows typical values obtained in ⅝ inch and ⅞ inch outside diameter nozzles of the different cross sections shown in Figures 1, 2, 3 and 6 at typical quantities of flow of argon gas.

The limiting relation of the perimeter of the gas stream to the quantity of gas flow and to the ratio of the density of the gas to its viscosity can be derived from the formulae already considered.

Taking the formula given above $$Re = \frac{4MKV}{12C}$$

and substituting for M the fraction $$\frac{a}{Z}$$

where
$a$ = cross section of the stream in square inches
$Z$ = perimeter of the cross section in inches $$Re = \frac{4aKV}{12CZ}$$

Taking the other formula given above, $$V = \frac{144q}{60a}$$

and substituting for V in the immediately preceding formula, $$Re = \frac{4aK144q}{12CZ60a}$$

$$= \frac{.8Kq}{CZ}$$

Taking $$\frac{K}{C} = f$$

then $$Re = \frac{.8qf}{Z}$$

and if $$Re < 3000$$

then $$Z > \frac{.8}{3000}qf$$

$$> .000268qf$$

Therefore, Z must be at least $.0003qf$ or greater where $q$ = quantity of gas flowing in cubic feet per minute; and $f$ = the ratio of the density of the shielding gas in pounds per cubic foot to its absolute viscosity in pounds per second per foot.

Laminar flow exists whenever the Reynolds number is less than 1050, and if the velocity is raised gradually, laminar flow will persist until the Reynolds number reaches 2100. Beyond that, little has been known until the Reynolds number exceeds 3000, at which time turbulence will always exist. This is true of gas flow in conduits of sufficient length to insure a stable condition, such length being not less than 50 times the diameter of the effective cross section area of the passage.

In examining Reynolds numbers and minimum lengths of passage necessary to achieve a stable condition, it will be seen that for most gases with the notable exception of helium, and for most practical nozzle sections, the Reynolds numbers fall into the somewhat indeterminate zone between 1050 and 3000. I find that for passages of cross section less than one square inch and of geometry other than a circular annulus, laminar flow will be established at Reynolds numbers less than 2200 after a length of flow between 20 and 50 times the equivalent diameter of the effective area of the cross section, depending on the state of turbulence of the gas prior to its entrance into the passage. For passages under one square inch in cross sectional area and of circular annular shape, I find that the Reynolds number can be increased to 3000 and still obtain laminar flow, after a similar length of flow.

The above conditions are contingent upon having the gas enter the passages in a state of comparative tranquility. For this reason it is extremely important to reduce the entering velocity of the gas and to absorb by some means its kinetic energy. This can be accomplished in many ways, the simplest being to interpose a passage of large cross section between the passage conveying gas in a turbulent manner and the nozzle where laminar flow is to be achieved. Another useful expedient is to change the direction of flow of the turbulent stream by baffles or other means that break down any definite patterns of turbulence which may become established and which will tend to persist in nozzles of even low Reynolds numbers for abnormally great lengths of passage.

Figure 4 shows the preferred construction of my invention. A housing 10 includes a long cylindrical sleeve at its lower end and a gas chamber 12 at its upper end. Gas is supplied to the chamber 12 through one or more tubes 14 preferably opening through a top wall 15 of the chamber. A baffle 17 extends transversely across the inside of the gas chamber 12 immediately below the inlet tubes 14 for deflecting the incoming gas streams.

A center guide tube 20 extends through the top 15 and downward through the gas chamber 12 and cylindrical sleeve 11. This tube 20 is preferably made of copper and serves as a conductor for supplying a high density electric current to an electrode wire 22 which is fed downward through the tube 20 by feed rolls 24 driven by an electric motor 25. The speed of the motor 25 is controlled by a variable resistance 26, but this resistance is merely representative of motor speed control devices; and the operation of the rollers 24 can be controlled as on conventional automatic welding heads if desired. In carrying out the method of this invention, the motor 25 is preferably used to advance the electrode wire 22 at a uniform feed.

Current is supplied to the tube 20 through a conductor 28 from a welding generator or other suitable source of power, and the current passes from the tube 20 to the electrode wire 22 through

*Table*

[Gas flow 1.0 cu. ft. per minute.]

| Nozzle, O. D. | Type (Fig. No.) | O. D. Electrode Guide $d^1$, Inches | I. D. Nozzle Shell $d^2$, Inches | Thickness of Fin in Inches $t$, Inches | Total Area $a$, Sq. In. | Argon Velocity, Ft./Sec. | Segment Area $a^1$, Sq. In. | Segment Perimeter | Segment $\frac{4M}{12}$ | Reynolds Number | Length, Inches |
|---|---|---|---|---|---|---|---|---|---|---|---|
| 5/8 | 1 | .125 | .500 | -------- | .184 | 13.0 | .184 | 1.97 | .0312 | 3,030 | 24.0 |
| 5/8 | 2 | .125 | .500 | .040 | .154 | 15.7 | .0384 | .785 | .0163 | 1,910 | 11.0 |
| 5/8 | 6 | .125 | .500 | .040 | .124 | 19.4 | .0155 | .541 | .0095 | 1,370 | 7.0 |
| 5/8 | 3 | .125 | .115 | -------- | .062 | 38.8 | -------- | -------- | -------- | 2,500 | 5.8 |
| 5/8 | 1 | .187 | .500 | -------- | .169 | 14.2 | .169 | 2.16 | .026 | 2,760 | 23.2 |
| 5/8 | 2 | .187 | .500 | .040 | .144 | 16.7 | .036 | .773 | .0155 | 1,930 | 10.7 |
| 5/8 | 2 | .187 | .500 | .020 | .157 | 15.3 | .039 | .813 | .016 | 1,840 | 11.1 |
| 7/8 | 1 | .250 | .750 | -------- | .393 | 6.1 | .393 | 3.14 | .0416 | 1,900 | 35.0 |
| 7/8 | 2 | .250 | .750 | .040 | .353 | 6.8 | .0882 | 1.205 | .0244 | 1,240 | 16.0 | brushes 29 formed at the lower end of the tube 20 by slotting the tube wall and swaging its lower edge portion inward to a diameter slightly less than the diameter of the electrode wire. This causes the electrode wire to spread the brushes 29 slightly and maintain sufficient friction for good electric contact.

The lower end of the center tube 20 is located at a distance of not more than twice its diameter above the bottom edge of the shell or sleeve 11. There is a cooling coil 32 wrapped around the bottom portion of the shell or sleeve 11. This coil 32 is in intimate contact with the surface of the sleeve 11 and preferably bonded thereto for rapid transfer of heat from the sleeve 11 to the water or other cooling fluid that flows through the coil 32 in the direction indicated by the arrows in Fig. 4.

Fins or partitions 35 are provided between the outside of the tube 20 and the inside surface of the sleeve 11. These fins or partitions are preferably radial and secured to the outside surface of the conductor tube 20. They serve a double function in that they not only hold the tube 20 in position in the sleeve 11 but they also provide a plurality of parallel passages or conduits of high a/Z ratio for the flow of gas from the chamber 12 downward through the shell or sleeve 11. The passages made by the partitions 35 are preferably less than one square inch in cross section.

It is a feature of the construction that the fins 35 are thin and that they have, therefore, lower end faces of no substantial area. If anything heavier than sheet metal is used for the fins 35, their lower end portions are tapered to thin or sharp bottom edges so that the gas streams flowing downward through the conduits provided by the fins 35 will merge into one another and form a continuous annular curtain of gas without encountering any corners extending transversely of their direction of flow. The fins terminate at a distance of only a few diameters above the end of sleeve 11 so that despite greater Reynolds number of the annular cross section any tendency to turbulence does not have sufficient length of passage to manifest itself.

The construction illustrated obtains a laminar flow of gas along the lower end of the electrode 22, and outward across the workpiece 34 as indicated by the arrows 36. Because of the fact that the curtain of gas has a laminar flow, entrainment of air is avoided, such entrainment being caused in the prior art principally by turbulence of the gas stream.

When welding in accordance with this invention, the gas first enters the chamber 12 through the tubes 14, and the baffle 17 causes the gas to spread out transversely away from the center tube 20 and toward the peripheral wall of the chamber 12. This flow carries the gas into a region of larger cross section with resulting large decrease in the velocity of the gas flow. The diameter of the baffle 17 is substantially less than the inside diameter of the upper portion of the gas chamber 12 so that there is ample clearance for gas to flow downward around the circumference of the baffle 17 at low velocity.

The lower end of the gas chamber 12 preferably tapers toward the top of the shell or sleeve 11 so that the gas acquires velocity gradually and is drawn from the upper portion of the chamber 12 across the entire transverse cross section of the chamber. This prevents the setting up of local convection currents through the gas chamber. The gas in the upper portion of the chamber 12 can be considered as in a state of comparative tranquility, the velocity being low because of the substantial cross section and the fact that what flow there is has wide distribution across the transverse cross section of the chamber 12.

In the upper portion of the shell or sleeve 11, the fins 35 restrict the gas flow to parallel columns and reduce the Reynolds number of the passages, thus preventing any possible turbulence and/or whirling or helical movement of the stream as it travels downward into the lower portion of the housing 10. At the lower ends of the fins 35, the parallel gas streams merge into an annular stream that flows downward along the center tube 20, past the brushes 29 and along electrode 22. The brushes 29 taper inward gradually so that the outside surface of the tube 20 meets the electrode 22 without any abrupt change in direction, such as would set up eddy currents in the gas stream. The length of the sleeve 11 is preferably of the order of not less than 20-50 times the diameter of the equivalent circular cross section of each passage between the fins.

This invention can be used with any of the gases commonly employed for shielding the arcs of non-consuming electrodes, or with mixtures of gases corresponding to the shields set up by the volatilizing of the coating materials used with coated electrodes, for example, the gas shield may be argon, helium, carbon monoxide, carbon dioxide or mixtures of these and various other gases, with or without entrained powders for stabilizing the arc.

The amount of gas required to adequately protect the weld metal depends partly upon the size of the electrode and partly upon the spacing of the lower end of the sleeve 11 away from the work. The velocity of the gas shield or blanket can be kept low by increasing the radial dimension of the annular space through which the gas is discharged from the lower end of the housing 10, while the Reynolds number can be kept low by increasing the ratio of cross section area to its perimeter.

The preferred forms of the invention have been illustrated and described but changes and improvements can be made and some features can be used alone or in different combinations without departing from the invention as defined in the claims.

What is claimed is:

1. Apparatus for arc welding including, in combination, a tube through which an electrode is advanced toward the arc, a housing having a lower portion with an outlet that surrounds the part of the electrode immediately back from the arc end of the electrode for discharging an uninterrupted annular curtain of gas downward around the region of the arc and across the surface of the weld, an enlarged gas chamber at one end of the housing with a transverse cross section several times larger than the cross section of the annular curtain, an inlet conduit through which gas is supplied to the chamber, and a baffle located in the upstream portion of the chamber immediately downstream from the inlet conduit in position to spread the gas stream from the conduit outward across the chamber so as to decrease the rate of movement of the gas in the chamber downstream of the baffle, said housing having a passage of uniform cross-section and greater length than width for supplying gas from said chamber to the outlet at the lower portion of the housing.

2. Apparatus for arc welding including, in combination, a tube through which an electrode is advanced toward the arc, a housing having a lower portion with an outlet, that surrounds the part of the electrode immediately back from the arc end of the electrode for discharging an uninterrupted annular curtain of gas downward around the region of the arc and across the surface of the weld, an enlarged gas chamber at one end of the housing with a transverse cross section several times larger than the cross section of the annular curtain, inlet conduits through which gas is supplied to the chamber at different regions, and baffle means located immediately downstream from all of the inlet conduits, said baffle means extending transversely to the direction of flow of the gas from the conduits and being of sufficient extent to cause the gas from the conduits to spread throughout the chamber with resulting decrease in velocity and elimination of local gas currents through the chamber.

3. Arc welding apparatus comprising a guide through which a bare electrode is fed toward a workpiece, a sleeve surrounding the guide and extending longitudinally along the guide to a region adjacent to the arc end of the electrode, fins extending between the guide and the sleeve along the length of the sleeve to a region near the arc end of the sleeve, said fins serving as partitions for creating a plurality of passages providing for gas flow at low Reynolds numbers and said fins having thin bottom end faces for the quiet merging of the gas streams flowing between the respective fins into an annular curtain of gas, the gas passage along the sleeve below the fins being free of restrictions that would reduce the cross section of the annular curtain, and a gas chamber, of substantially larger cross section than the sleeve, located at the upper end of the sleeve.

4. Apparatus for supplying a laminar flow gas shield to a region of electric welding, said apparatus comprising means for feeding a consuming electrode to the region to be welded, a guide through which the electrode passes, said guide including one or more brushes near its lower end for supplying current to the electrode, a sleeve surrounding the guide and through which an annular curtain of gas flows downward to the region of the weld, a gas chamber of substantially larger cross section than the annular curtain of gas, said chamber having a tapered end connecting it with the upper end of the sleeve for producing a gradual and quiet acceleration of the gas from its condition in the chamber to a desired low velocity along the sleeve surrounding the electrode guide.

5. Arc welding apparatus comprising a housing having a gas chamber at its upper end and a cylindrical sleeve extending from the gas chamber to the lower end of the housing, partitions dividing the interior of the sleeve into passages along a length of said sleeve equal to at least nine times the inside diameter of the sleeve and having a cross section of less than one square inch, a gas inlet conduit opening into the chamber, a baffle in the chamber downstream from the inlet conduit, an electrode guide comprising a center tube extending through the gas chamber and downward through the sleeve, the outside diameter of said tube being of a minor portion of the maximum inside diameter of the chamber above the sleeve, said partitions comprising radial fins on the outside of the tube holding the tube centrally located in the sleeve said fins extending from a region near the upper end of the sleeve downward and terminating near the lower end of the sleeve, and said fins having lower end faces of small area so that gas streams flowing through the conduits formed by the tube, sleeve and fins merge quietly into one another as they come together into a continuous annular stream, brushes at the lower end of the tube formed by slitted tongues at the bottom of the tube bent inwardly against the electrode along curves of fair form leaving the surfaces with which the gas comes into contact free of abrupt changes in direction.

6. The method of arc welding with sound and ductile welds free from porosity, which method comprises passing electric current through a weld-depositing metal electrode and advancing the electrode toward the arc, the magnitude of current and the rate of advance being sufficient to assure a substantial proportion of the electrode metal in the resultant weld metal, continuously flowing an annular stream of gas downward and around the electrode and the arc and maintaining laminar or non-turbulent flow of the gas stream by confining the cross-section of the gas stream and coordinating its velocity with the cross section so as to keep the Reynolds number below 3000 immediately upstream from the arc for a distance of at least twenty times the effective diameter of the stream.

7. The method of arc welding with sound and ductile welds free from porosity, which method comprises passing electric current through a weld depositing metal electrode and advancing the electrode toward the arc, the magnitude of current and the rate of advance being sufficient to assure a substantial proportion of the electrode metal in the resultant weld metal, continuously flowing a plurality of streams of gas downward in an annular zone around the electrode and the arc and maintaining a laminar or non-turbulent flow of each gas stream immediately upstream from the arc by keeping the Reynolds number of each stream below 3000 and by confining each stream to an effective diameter not greater than $1/20$ of the length of the stream.

8. The method of arc welding with sound and ductile welds free from porosity, which method comprises passing electric current through a weld depositing metal electrode and advancing the electrode toward the arc, the magnitude of current and the rate of advance being sufficient to assure a substantial proportion of the electrode metal in the resultant weld metal, continuously flowing an annular stream of gas around the electrode and the arc and maintaining the laminar or non-turbulent flow of the gas stream by confining the cross-section of the gas stream and coordinating its velocity with the cross section so as to keep the Reynolds number below 3000 immediately upstream from the arc and reducing the velocity of the gas just before it enters the laminar stream to a velocity substantially less than the velocity of the laminar stream by expanding the gas stream immediately prior to its entrance into the laminar stream.

9. The method of arc welding with sound and ductile welds free from porosity, which method comprises passing electric current through a weld depositing metal electrode and advancing the electrode toward the arc, the magnitude of current and the rate of advance being sufficient to assure a substantial proportion of the electrode metal in the resultant weld metal, continuously flowing a plurality of streams of gas along the electrode and in a zone surrounding the electrode and the arc, and maintaining the laminar or non-turbulent flow of each gas stream by confining the cross-section of the gas stream and coordinating its velocity with the cross section so as to keep the Reynolds number below 3000 immediately upstream from the arc and reducing the velocity of the gas just before it enters the laminar stream to a velocity substantially less than the velocity of the laminar stream by expanding the gas immediately prior to its entrance into the laminar stream.

10. The method of arc welding with sound and ductile welds free from porosity, which method comprises passing electric current through a weld depositing metal electrode and advancing the electrode toward the arc, the magnitude of current and the rate of advance being sufficient to assure a substantial proportion of the electrode metal in the resultant weld metal, continuously flowing an annular stream of gas along the electrode and in a zone surrounding the electrode and the arc, and maintaining the laminar or non-turbulent flow of the gas stream by confining the cross-section of the gas stream and coordinating its velocity with the cross section so as to keep the Reynolds number below 3000 immediately upstream from the arc and reducing the lateral motion or turbulence of the gas just before it enters the laminar stream by dividing it into a plurality of extremely small streams immediately prior to its entrance into the laminar stream.

11. The method of arc welding with sound and ductile welds free from porosity, which method comprises passing electric current through a weld depositing metal electrode and advancing the electrode toward the arc, the magnitude of current and the rate of advance being sufficient to assure a substantial proportion of the electrode metal in the resultant weld metal, continuously flowing a plurality of streams of gas along the electrode and in a zone surrounding the electrode and the arc, and maintaining the laminar or non-turbulent flow of each gas stream in said zone by confining the cross-section of the gas stream and coordinating its velocity with the cross section so as to keep the Reynolds number below 3000 immediately upstream from the arc and reducing the lateral motion or turbulence of the gas just before it enters the laminar stream zone by dividing it into a plurality of extremely small streams immediately prior to its entrance into the laminar stream zone.

12. The method of arc welding with sound and ductile welds free from porosity, which method comprises passing electric current through a weld depositing metal electrode and advancing the electrode toward the arc, the magnitude of current and the rate of advance being sufficient to assure a substantial proportion of the electrode metal in the resultant weld metal, continuously flowing an annular stream of gas along the electrode and in a zone surrounding the electrode and the arc, and maintaining the laminar or non-turbulent flow of the gas stream in said zone by confining the cross-section of the gas stream and coordinating its velocity with the cross section so as to keep the Reynolds number below 3000 immediately upstream from the arc and reducing the lateral motion and turbulence of the gas at the beginning of the laminar stream zone by subjecting the gas to a series of abrupt right angle turns immediately prior to its entrance into the laminar stream zone.

13. The method of arc welding with sound and ductile welds free from porosity, which method comprises passing electric current through a weld depositing metal electrode and advancing the electrode toward the arc, the magnitude of current and the rate of advance being sufficient to assure a substantial proportion of the electrode metal in the resultant weld metal, continuously flowing a plurality of streams of gas along the electrode and in a zone surrounding the electrode and the arc, and maintaining the laminar or non-turbulent flow of each gas stream by confining the cross-section of the gas stream and coordinating its velocity with the cross section so as to keep the Reynolds number below 3000 immediately upstream from the arc and reducing the lateral motion and turbulence of the gas at the beginning of the laminar stream zone by subjecting it to a series of abrupt right angle turns immediately prior to its entrance into the laminar stream zone.

14. The method of arc welding with sound and ductile welds free from porosity, which method comprises passing electric current through a weld depositing metal electrode and advancing the electrode toward the arc, the magnitude of current and the rate of advance being sufficient to assure a substantial proportion of the electrode metal in the resultant weld metal, continuously flowing an annular stream of gas along the electrode and the arc, and maintaining a laminar or non-turbulent flow of the gas stream by confining the stream to a cross sectional area having its total perimeter in inches equal to at least $.0003qf$, where $q$ is the quantity of gas flowing in cubic feet per minute and $f$ is the ratio of the density of the shielding gas in pounds per cubic foot to its absolute viscosity in pounds per second per foot.

15. The method of arc welding with sound and ductile welds free from porosity, which method comprises passing electric current through a weld depositing metal electrode and advancing the electrode toward the arc, the magnitude of current and the rate of advance being sufficient to assure a substantial proportion of the electrode metal in the resultant weld metal, continuously flowing an annular stream of gas along the electrode and in a zone surrounding the electrode and the arc, and maintaining a laminar or non-turbulent flow of the gas stream by confining the stream to a cross sectional area having its total perimeter in inches equal to at least $.0003qf$, where $q$ is the quantity of gas flowing in cubic feet per minute and $f$ is the ratio of the density of the shielding gas in pounds per cubic foot to its absolute viscosity in pounds per second per foot, and by maintaining this perimeter and cross sectional area the same for a distance of not less than twenty times the effective diameter of the annular stream.

16. The method of arc welding with sound and ductile welds free from porosity, which method comprises passing electric current through a weld depositing metal electrode and advancing the electrode toward the arc, the magnitude of current and the rate of advance being sufficient to assure a substantial proportion of the electrode metal in the resultant weld metal, continuously flowing a plurality of streams of gas along the electrode and in an annular zone surrounding the electrode and the arc, and maintaining a laminar or non-turbulent flow of each gas stream by confining the streams to cross sectional areas, the sum of the perimeters in inches being equal to at least $.0003qf$, where $q$ is the quantity of gas flowing in cubic feet per minute and $f$ is the ratio of the density of the shielding gas in pounds per cubic foot to its absolute viscosity in pounds per second per foot, and maintaining these perimeters and cross sectional area relationship for a distance of not less than twenty times the effective diameter of each stream.

17. An arc welding method according to claim 14 in which the gas is selected from the group consisting of helium and argon.

18. An arc welding method according to claim 14 in which the gas is selected from the group consisting of helium and argon and where $q$ has a value of from about ½ to about 1½ cubic feet per minute.

19. An arc welding method according to claim 14 in which the gas is selected from the group consisting of helium and argon and in which said annular stream has an outer diameter of the order of from about one-half inch to about three-fourths inch.

GEORGE MIKHALAPOV.

REFERENCES CITED

The following references are of record in the file of this patent:

UNITED STATES PATENTS

| Number | Name | Date |
|---|---|---|
| 1,309,696 | Roberts et al. | July 15, 1919 |
| 1,746,081 | Hobart | Feb. 4, 1930 |
| 1,746,191 | Devers | Feb. 4, 1930 |
| 1,746,196 | Langmuir et al. | Feb. 4, 1930 |
| 2,446,598 | Klinke | Aug. 10, 1948 |
| 2,468,808 | Drake | May 3, 1949 |